(12) United States Patent
Liu

(10) Patent No.: US 8,750,585 B2
(45) Date of Patent: Jun. 10, 2014

(54) METHOD AND SYSTEM FOR SEGMENTING A LIVER OBJECT IN AN IMAGE

(75) Inventor: Jimin Liu, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 89 days.

(21) Appl. No.: 13/502,121

(22) PCT Filed: Oct. 13, 2010

(86) PCT No.: PCT/SG2010/000385
§ 371 (c)(1),
(2), (4) Date: Apr. 13, 2012

(87) PCT Pub. No.: WO2011/046511
PCT Pub. Date: Apr. 21, 2011

(65) Prior Publication Data
US 2012/0207366 A1 Aug. 16, 2012

(30) Foreign Application Priority Data
Oct. 13, 2009 (SG) ............... 200906871-9

(51) Int. Cl.
*G06K 9/00* (2006.01)
(52) U.S. Cl.
USPC ........... 382/128; 382/154; 382/274; 382/278; 128/922; 128/923
(58) Field of Classification Search
USPC .......... 382/128, 130, 131, 274, 278; 128/922, 128/923
See application file for complete search history.

(56) References Cited

U.S. PATENT DOCUMENTS

| 5,857,030 A | 1/1999 | Gaborski et al. |
| 6,575,969 B1 * | 6/2003 | Rittman et al. ............. 606/41 |

(Continued)

FOREIGN PATENT DOCUMENTS

| CN | 101404085 A | 4/2009 |
| WO | WO 2008/024083 A2 | 2/2008 |
| WO | WO 2009/108135 A1 | 9/2009 |

OTHER PUBLICATIONS

PCT International Search Report for PCT Counterpart Application No. PCT/SG2010/000385 containing Communication relating to the Results of the International Search Report, 7 pgs., (Feb. 18, 2011).

(Continued)

*Primary Examiner* — Yosef Kassa
(74) *Attorney, Agent, or Firm* — Blakely, Sokoloff, Taylor & Zafman LLP

(57) ABSTRACT

A method for segmenting an object of interest (which may be a liver object) in an input image is disclosed. The method comprises the steps of: (a) segmenting the points in a region of interest in the input image into a first and second group of points using predetermined intensity threshold values; (b) identifying a first set of small connected components formed by points in the first group of points and transferring the points in the first set of small connected components to the second group of points; (c) identifying a second set of small connected components formed by points in the second group of points and transferring the points in the second set of small connected components to the first group of points; and (d) forming the segmented object of interest using the first group of points.

21 Claims, 12 Drawing Sheets

(56) References Cited

U.S. PATENT DOCUMENTS

| | | | | |
|---|---|---|---|---|
| 6,685,639 | B1* | 2/2004 | Wang et al. | 600/439 |
| 6,993,174 | B2 | 1/2006 | Fan et al. | |
| 7,072,045 | B2* | 7/2006 | Chen et al. | 356/479 |
| 7,469,056 | B2* | 12/2008 | Ramm et al. | 382/128 |
| 7,764,822 | B2* | 7/2010 | Ramm et al. | 382/133 |
| 7,906,555 | B2* | 3/2011 | Flynn et al. | 514/602 |
| 7,953,204 | B2* | 5/2011 | Sumanaweera et al. | 378/65 |
| 8,188,688 | B2* | 5/2012 | Balakin | 315/503 |
| 8,233,681 | B2* | 7/2012 | Aylward et al. | 382/128 |
| 8,373,145 | B2* | 2/2013 | Balakin | 250/492.3 |
| 2006/0098870 | A1 | 5/2006 | Tek et al. | |

OTHER PUBLICATIONS

PCT Written Opinion of the International Searching Authority for PCT Counterpart Application No. PCT/SG2010/000385, 8 pgs., (Feb. 18, 2011).

PCT International Preliminary Report on Patentability (Chapter II of the Patent Cooperation Treaty) for PCT Counterpart Application No. PCT/SG2010/000385, 17 pgs., (Aug. 24, 2011).

Wenyu Chen, et al., "Constructing Triangular Meshes of Minimal Area", Computer-Aided Design and Applications, vol. 5, Nos. 1-4, pp. 508-518, (2008).

Shiying Hu, et al., "Automatic Lung Segmentation for Accurate Quantitation of Volumetric X-Ray CT Images", IEEE Transactions on Medical Imaging, vol. 20, No. 6, pp. 490-498, (Jun. 2001).

Ping-Sung Liao, et al., "A Fast Algorithm for Multilevel Thresholding", Journal of Information Science and Engineering, vol. 17, pp. 713-727, (2001).

Rashindra Manniesing, et al., "Vessel Enhancing Diffusion: A Scale Space Representation of Vessel Structures", Medical Image Analysis, vol. 10, pp. 815-825, (2006).

Mevis Medical Solutions, "MeVis Distant Services", retrieved from the Internet Archive WayBack Machine: http://www.mevismedical.com/MeVis_Distant_Services.html, 1 pg., (Dec. 21, 2008).

S.A. Nicolau, et al., "An Augmented Reality System for Liver Thermal Ablation: Design and Evaluation on Clinical Cases", Medical Image Analysis, vol. 13, pp. 494-506, (2009).

Nobuyuki Otsu, "A Threshold Selection Method from Gray-Level Histograms", IEEE Transactions on Systems, Man, and Cybernetics, vol. SMC-9, No. 1, pp. 62-66, (Jan. 1979).

Xiaoning Qian, et al., "A Non-Parametric Vessel Detection Method for Complex Vascular Structures", Med. Image Anal., vol. 13, No. 1, pp. 49-61, (Feb. 2009).

Bernhard Reitinger, et al., "Liver Surgery Planning Using Virtual Reality", IEEE Computer Graphics and Applications, vol. 26, No. 6, pp. 36-47, (Nov. / Dec. 2006).

Dirk Selle, et al., "Analysis of Vasculature for Liver Surgical Planning", IEEE Transactions on Medical Imaging, vol. 21, No. 11, pp. 1344-1357, (Nov. 2002).

Alex Vlachos, et al., "Curved PN Triangles", Proceedings of the 2001 Symposium on Interactive 3D Graphics, pp. 159-166, (2001).

Jimin Liu, et al., "Automatic Segmentation of the Human Brain Ventricles from MR Images by Knowledge-Based Region Growing and Trimming," Neuroinform, vol. 7, No. 2, pp. 131-146 (May 16, 2009).

Zhihong Mao, et al., "A Modified Nielson's Side-Vertex Triangular Mesh Interpolation Scheme", Computational Geometry and Applications (CGA '05) Workshop, pp. 776-785, (2005).

Office Action for corresponding Chinese Patent Application No. 201080046542.2, 6 pages (Feb. 7, 2014).

* cited by examiner

METHOD AND SYSTEM FOR SEGMENTING A LIVER OBJECT IN AN IMAGE

CROSS-REFERENCE TO RELATED APPLICATIONS

This patent application is a U.S. National Phase Application under 35 U.S.C. §371 of International Application No. PCT/SG2010/000385, filed Oct. 13, 2010, entitled A METHOD AND SYSTEM FOR SEGMENTING A LIVER OBJECT IN AN IMAGE, which claims priority to Singapore Patent Application No. 200906871-9, filed Oct. 13, 2009.

FIELD OF THE INVENTION

The present invention relates to a method and system for segmenting objects in an image. The objects may be anatomy structures. The particular application example is the segmentation of liver objects in medical images, such as CT images.

BACKGROUND OF THE INVENTION

To achieve better results in the diagnosis, treatment and monitoring of liver diseases, such as liver failure due to cirrhosis and liver cancer (both primary and secondary), an accurate segmentation of liver structures (or liver objects) in medical images, such as CT images, is required. The liver objects may be for example, the liver itself, a tumor in the liver, vasculature structure in the liver (i.e. liver vessels) or functional segments of the liver.

Manual segmentation of liver structures in CT images is not only time consuming, it also involves large inter- and intra-expert variations. Although automatic segmentation methods may be adopted instead, these automatic segmentation methods are typically based on various expected properties of images or structures and may thus fail to produce sufficiently accurate results when the properties of the test images or structures deviate from the expected properties. Alternatively, interactive methods may be employed. However, most interactive methods have their limitations in their applicability to segmenting medical images in a clinical setting. For example, they may be sensitive to how numerous parameters or initial positions of certain points are set. Furthermore, when using interactive methods, a large amount of user interaction may be required to keep track of the topology of a structure, or to handle structures comprising small complex details.

At present, many liver surgical planning prototype systems [1, 2, 3] mainly employ user-visualization and user-interaction for a subjective or qualitative assessment of liver objects and there has been no extensive investigation on how to perform reliable and efficient liver object segmentation. For example, although MeVis [4] provides a service for liver object segmentation, it is almost impossible to use this service for emergency cases. This is because to use this service provided by MeVis, the hospitals are required to send the CT scans to MeVis, and for each case, several days are required before the liver object segmentation results can be obtained.

SUMMARY OF THE INVENTION

The present invention aims to provide a new and useful method and system for segmenting objects in an image.

In general terms, the present invention proposes in a first aspect a segmentation technique having a quality which is improved by identifying small connected components after segmenting points in the image using predetermined intensity threshold values. The identification of these small connected components is advantageous as it can be used to remove false positive points or recover false negative points to improve the segMentation results.

Specifically, a first aspect of the present invention is a method for segmenting an object of interest in an input image comprising a plurality of points having respective intensity values representing medical data, the method comprising the steps of: (a) segmenting the points in a region of interest in the input image into a first and second group of points using predetermined intensity threshold values; (b) identifying a first set of small connected components formed by points in the first group of points and transferring the points in the first set of small connected components to the second group of points; (c) identifying a second set of small connected components formed by points in the second group of points and transferring the points in the second set of small connected components to the first group of points; and (d) forming the segmented object of interest using the first group of points.

The particular application example is the segmentation of liver objects in medical images, such as CT images.

A second aspect of the invention proposes that a user manually moves (e.g. using a data input device such as a mouse) a plurality of control points, to successively improve a numerical model which is defined by the control points, and which itself generates at least one surface. The method may be used to obtain a region of interest for use in a segmentation technique. Alternatively, it may be used to partition a liver model into a plurality of segments, by forming a numerical model for each of the segments, and then partitioning the liver model using the surfaces.

A third aspect of the invention proposes calculating the vessel structure of a liver by generating seed points which are in vessels of the liver, obtaining a vessel direction for each of the seed points, and then growing vessel regions around each seed point in the vessel direction.

A fourth aspect of the present invention is a method for segmenting liver objects comprising a liver, at least one liver tumor and liver vessels in a three-dimensional input image comprising a plurality of points having respective intensity values representing medical data, the method comprising the steps of: (a) defining a region of interest which takes the expected shape of the liver in the image; (b) segmenting the liver in the region of interest; (c) segmenting the at least one liver tumor in the region of interest; (d) segmenting the liver vessels in the region of interest; (e) smoothing the segmented liver objects; and (f) partitioning the segmented liver into functional liver segments. A region of interest which takes the expected shape of the liver in the image roughly fits the liver in the image and contains only a small percentage of non-liver regions. This facilitates the subsequent processing steps for segmenting the liver objects.

The invention may alternatively be expressed as a computer system for performing the above methods. This computer system may be integrated with a device for capturing images. The invention may also be expressed as a computer program product, such as one recorded on a tangible computer medium, containing program instructions operable by a computer system to perform the steps of the above methods.

BRIEF DESCRIPTION OF THE FIGURES

An embodiment of the invention will now be illustrated for the sake of example only with reference to the following drawings, in which:

FIG. 8(a) illustrates the results obtained from segmenting non-liver regions in the method of FIG. 1(a) whereas FIGS. 8(b)-8(e) illustrate the results obtained from segmenting the liver in the method of FIG. 1(a);

DETAILED DESCRIPTION OF THE EMBODIMENTS

Figure 1A:
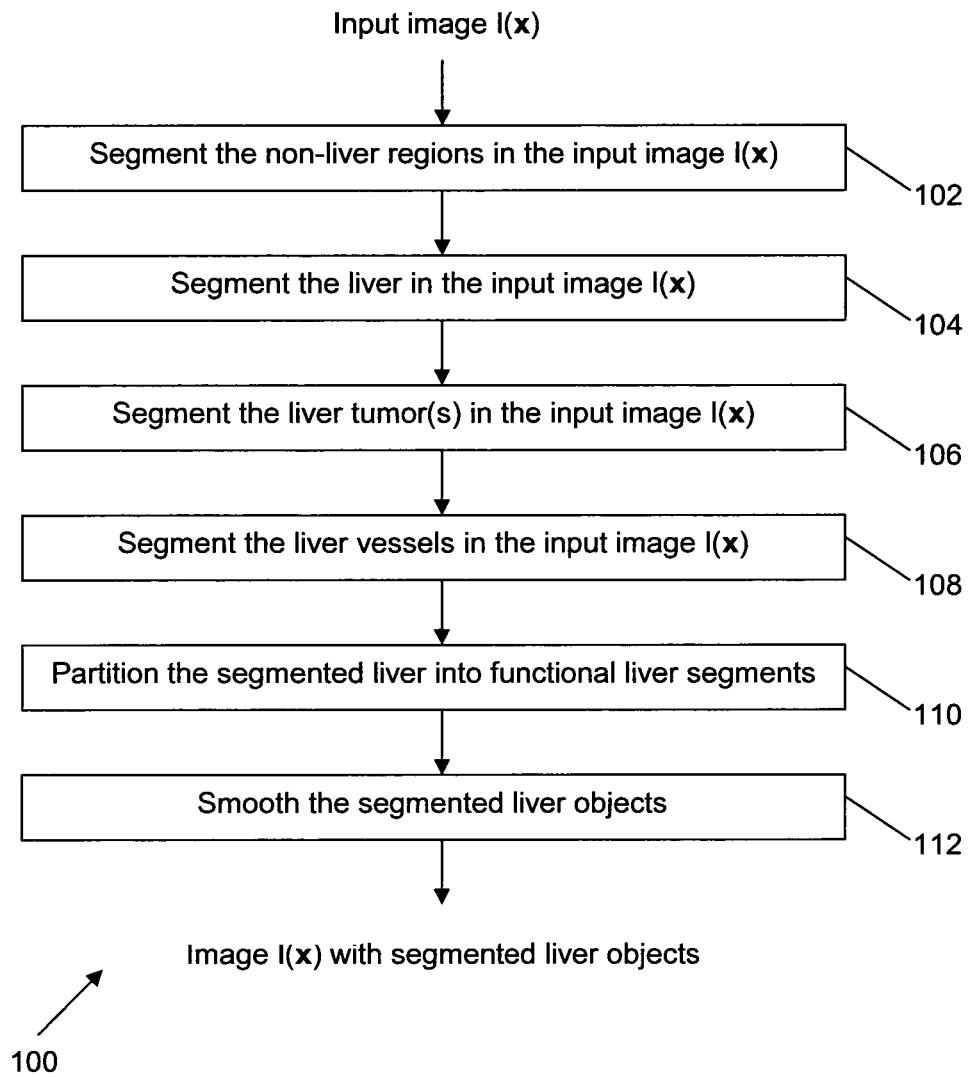
FIG. 1(a) illustrates a flow diagram of a method for segmenting liver objects in an image according to an embodiment of the present invention.

Referring to FIG. 1(a), the steps are illustrated of a method 100 which is an embodiment of the present invention, and which segments liver objects in an image.

Figure 1B:
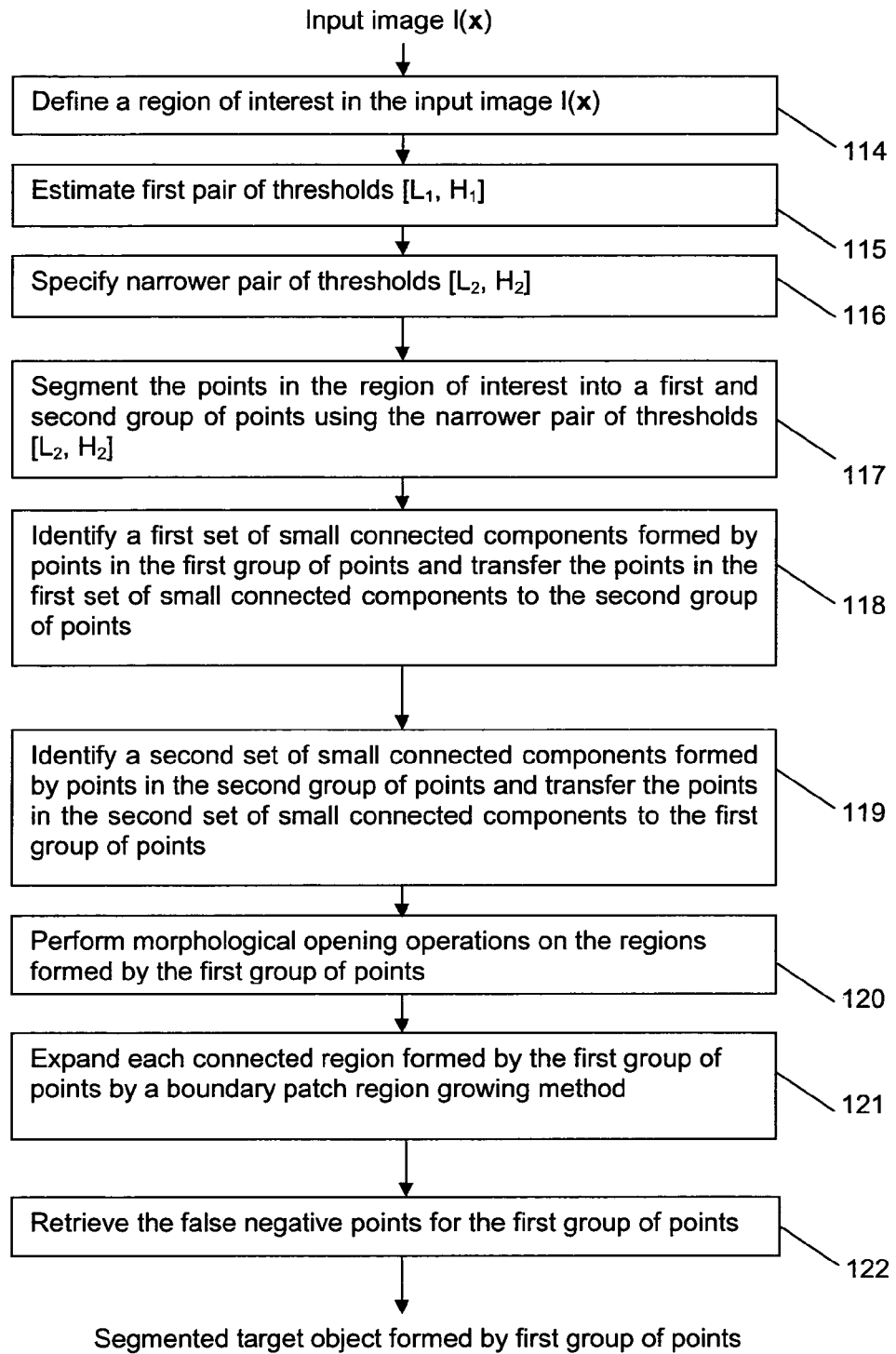
FIG. 1(b) illustrates the first step in the method of FIG. 1(a)

The input to method 100 is a three-dimensional image I(x) which may be a Computed Tomography (CT) image or any other type of image. The input image is defined in a domain $D \subset R^3$ and comprises a plurality of points (voxels) having respective intensity values representing medical data. In step 102, the non-liver regions in the image I(x) are segmented. The sub-steps of step 102 are illustrated in FIG. 1(b). In step 104, the liver in the input image I(x) is segmented whereas in step 106, the liver tumor in the image I(x) is segmented (this may include segmenting multiple tumors if such tumors are present in the image). In step 108, liver vessels, in the image I(x) are segmented. In step 110, the segmented liver from step 104 is partitioned into functional liver segments and in step 112, the segmented liver objects (i.e. the segmented liver from step 104, the segmented liver tumor from step 106 and the segmented liver vessels from step 108) are smoothed. Steps 102 to 112 will now be described in more detail.

Step 102: Segment the Non-Liver Regions in the Image I(x)

In step 102, a first region of interest $\Omega$ is first defined (step 114 of FIG. 1(b)). Note that the first region of interest $\Omega$ may comprise all the points in the image I(x) (i.e. the first region of interest $\Omega$ is the entire image I(x)). In one example, the first region of interest $\Omega$ is defined by the following example method.

Region of Interest Delineation by Triangular Mesh Interpolation

Figure 2:
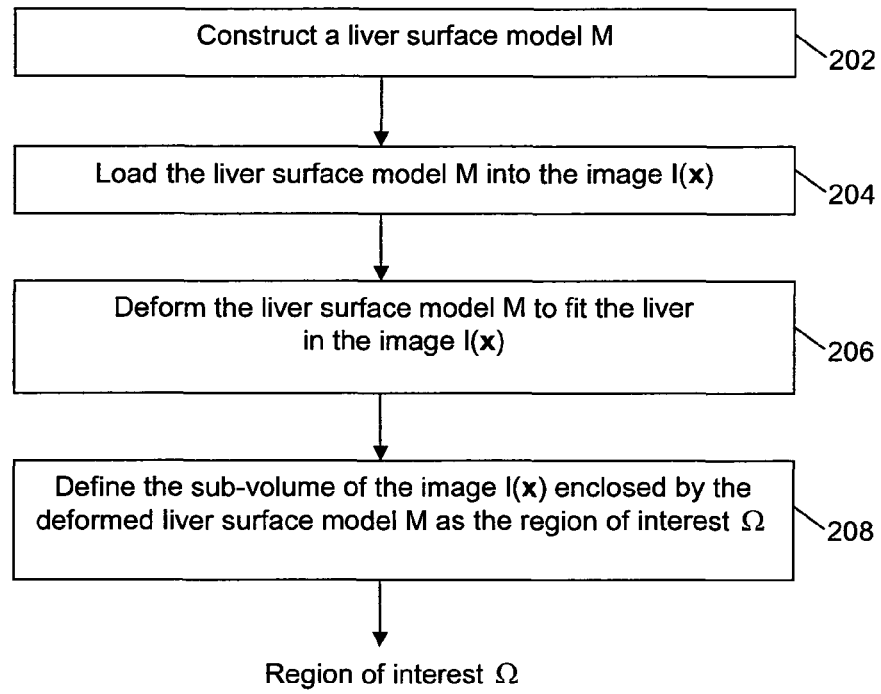
FIG. 2 illustrates a flow diagram of sub-steps for defining a region of interest in the method of FIG. 1(b)

FIG. 2 illustrates a flow diagram showing the sub-steps 202-208 for defining the first region of interest $\Omega$ in step 102.

In sub-step 202, a liver surface model M (typically, a simplified liver surface model) is first constructed by interpolating a plurality of control points. This interpolation is performed such that the resulting first region of interest $\Omega$ takes the expected shape of the liver in the input image.

Figure 3:
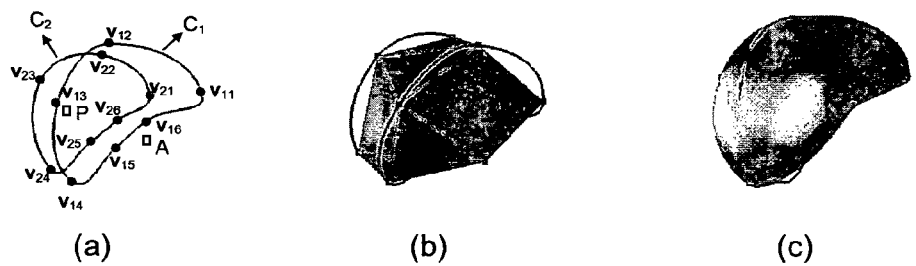
FIGS. 3(a)-3(c) illustrate the sub-steps for constructing a liver surface model in the method of FIG. 2.

In one example as shown in FIGS. 3(a)-3(c), the liver surface model M is constructed from 14 control points. The locations of the control points are determined using a liver model derived from a previously segmented liver or from for example a liver atlas.

FIG. 3(a) shows the 14 control points used to construct the liver surface model M. Six of the control points $v_{11}, v_{12}, \ldots, v_{16}$ lie on a first Bezier contour $C_1$, six of the control points $v_{21}, v_{22}, \ldots, v_{26}$ lie on a second Bezier contour $C_2$ and two of the control points are extreme landmark points A and P, respectively indicating the most anterior point and the most posterior point of a liver. The contours $C_1$ and $C_2$ as shown in FIG. 3(a) lie parallel to the coronal plane. Points $v_{11}$ and $v_{21}$ are on the left lateral side of the model; points $v_{12}$ and $v_{22}$ are on the most superior end of the model; points $v_{13}$ and $v_{23}$ are on the right lateral side of the model; points $v_{14}$ and $v_{24}$ are on the most inferior end of the model; points $v_{15}$ and $v_{16}$, and points $v_{25}$ and $v_{26}$ are uniformly distributed between points $v_{14}$ and $v_{11}$, and points $v_{24}$ and $v_{21}$ respectively. Furthermore, the anterior-posterior distances (i.e. the differences in y coordinates defined based on a traditional radiologist coordinate system) among the point A, the mass center of contour $C_1$, the point B and the mass center of contour $C_2$ are the same.

FIG. 3(b) shows a frame mesh (or triangular mesh) S constructed using the 14 control points shown in FIG. 3(a). This frame mesh is constructed by linking point A to each point $v_{1i}$ in contour $C_1$, point P to each point $v_{2j}$ in contour $C_2$ and each point $v_{1i}$ in contour $C_1$ to a point $v_{2j}$ in contour $C_2$ nearest to the point $v_{1i}$ (i, j=1, 2, ..., 6).

FIG. 3(c) shows the liver surface model M generated from the frame mesh S. The liver surface model M is a smooth mesh or in other words, a smoothed triangular surface and may be generated using state-of-the-art triangular mesh interpolation techniques [5,6]. The shape of the liver surface model M can be adjusted either globally or locally by changing the positions of one or more of the control points.

The liver surface model is then fitted to a liver in the input image. In sub-step 204, the liver surface model M is first loaded into the input image I(x) and in sub-step 206, this liver surface model M is then deformed using the plurality of control points to fit the liver in the image I(x). In one example, the liver surface model M is first globally deformed by manually dragging the boards of the bounding box of the liver surface model M. Local refinement of the liver surface model M is then performed by manually adjusting the positions of the control points. Note that the liver surface model M may also be adjusted automatically (i.e. without user intervention) based on some pre-loaded parameters. In sub-step 208, the sub-volume of the input image enclosed by the fitted liver surface model M is output as the first region of interest $\Omega$.

FIGS. 4(a)-4(d) illustrate the results obtained from sub-steps 204-208. In particular, FIGS. 4(a)-4(d) each include four images which respectively illustrate selected axial, coronal and sagittal slices of the input image comprising the liver surface model after the corresponding sub-step and a 3D perspective of the liver surface model in the input image after the corresponding sub-step.

Figure 4:
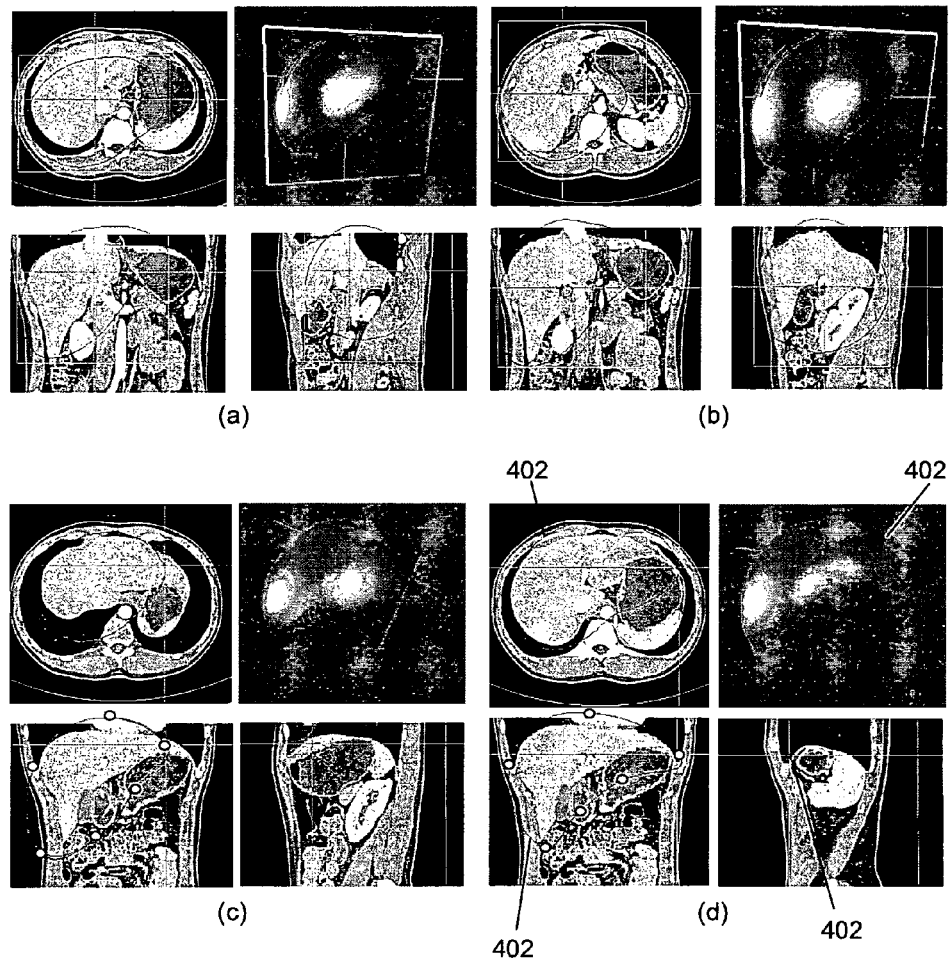
FIGS. 4(a)-4(d) illustrate the results obtained from the method of FIG. 2.

FIG. 4(a) shows the results obtained after loading the liver surface model M in sub-step 204. FIG. 4(b) illustrates the results after globally deforming the loaded liver surface model M in sub-step 206 whereas FIGS. 4(c) and 4(d) respectively illustrate the results after performing a first and second local refinement in sub-step 206. The volume within the boundary 402 as shown in FIG. 4(d) is output as the first region of interest $\Omega$ in sub-step 208.

Next in step 102, the non-liver regions (i.e. regions not comprising liver objects) in the first region of interest Ω are segmented. There is usually a high intensity contrast between the non-liver regions and the regions comprising liver objects. The non-liver regions may comprise a portion of the bone and a portion of the kidney (which may be the right kidney). In one example, the non-liver regions in the first region of interest Ω are segmented using the HTANR method described below.

Segmentation by Hysteretic Thresholding with Adaptive Noise Removal (HTANR Method)

The following describes the steps of an example method for segmenting a target object (or in other words, an object of interest) in an image $I_{HTANR}(x)$ to obtain a binary image $B_{HTANR}(x)$. This method is referred to as the Hysteresis Thresholding with Adaptive Noise Removal (HTANR) method and may be used independently of method 100 on any type of object in any type of image. It corresponds to steps 115-122 of FIG. 1(*b*). The image $I_{HTANR}(x)$ may be a two-dimensional image or a three-dimensional image. Furthermore, the image $I_{HTANR}(x)$ may be a region of interest in a larger image. For example, in step 102, the image $I_{HTANR}(x)$ is the first region of interest Ω and the target object comprises the non-liver regions.

Step 1: A wide pair of intensity threshold values $[L_1, H_1]$ for segmenting the target object is defined (step 115 of FIG. 1(*b*)). This may be done using state-of-the-art methods, for example, the methods in references [8, 9, 10].

Step 2: A narrow pair of intensity threshold values $[L_2, H_2]$ for segmenting the target object is defined such that $L_1 \leq L_2 \leq H_2 \leq H_1$ (step 116 of FIG. 1(*b*)). In other words, the wide pair of intensity threshold values is further apart than the narrow pair of intensity threshold values.

Step 3: A binary image $B_{HTANR}(x)$ is generated (step 117 of FIG. 1(*b*)). This is performed by segmenting the points in the image $I_{HTANR}(x)$ into different groups of points using the narrow pair of intensity threshold values $[L_2, H_2]$. In one example, for each point x in the image $I_{HTANR}(x)$, if the intensity value of the point x lies between $L_2$ and $H_2$ (i.e. if $L_2 \leq$ Intensity value of $x \leq H_2$), the label of point x is set as 1. Otherwise, the label of point x is set as 0. This forms a binary image $B_{HTANR}(x)$ comprising a first and second group of points with labels 1 and 0 respectively.

Step 4: The false positive points in the binary image $B_{HTANR}(x)$ are removed (step 118 of FIG. 1(*b*)). This is performed by identifying a first set of small connected components formed by points with the label 1 in the binary image $B_{HTANR}(x)$. An example method for identifying small connected components is described below. The labels of the points within these small connected components are then changed from 1 to 0 i.e. these points are transferred from the first group of points to the second group of points.

Step 5: The false negative points in the binary image $B_{HTANR}(x)$ are recovered (step 119 of FIG. 1(*b*)). This is performed by identifying a second set of small connected components formed by points with the label 0 in the binary image $B_{HTANR}(x)$. An example method for identifying small connected components is described below. The labels of the points within these small connected components are then changed from 0 to 1 i.e. these points are transferred from the second group of points to the first group of points. This fills the small holes in the regions formed by points with the label 1.

Step 6: Small artifacts formed by points with the label 1 in the binary image $B_{HTANR}(x)$ are removed (step 120 of FIG. 1(*b*)). In one example, they are removed by applying morphological opening operations on the regions formed by points with the label 1 in the binary image $B_{HTANR}(x)$.

Step 7: Each connected region formed by points with the label 1 in the binary image $B_{HTANR}(x)$ is then expanded to include neighboring points with intensity values between the wide pair of intensity threshold values $[L_1, H_1]$ (step 121 of FIG. 1(*b*)). In one example, this is performed using the boundary patch region growing method [11]. A step of segmenting the points in the image $I_{HTANR}(x)$ into different groups of points using the wide pair of thresholds $[L_1, H_1]$ may be performed prior to the expansion of the connected regions in step 7 to facilitate this expansion.

Step 8: The false negative points in the binary image $B_{HTANR}(x)$ are recovered (step 122 of FIG. 1(*b*)). This is performed by identifying a third set of small connected components formed by points with the label 0 in the binary image $B_{HTANR}(x)$. The labels of the points within these small connected components are then changed from 0 to 1 i.e. these points are transferred from the second group of points to the first group of points. This fills the small holes in the regions formed by points with the label 1 to form a final binary image $B_{HTANR}(x)$. The segmented target object formed by points with the label 1 in the final binary image $B_{HTANR}(x)$ is thus obtained.

Small Connected Component Identification

The following describes the steps of an example method for identifying small connected components in an image $I_{SCC}(x)$ comprising a plurality of points x with respective labels label(x). Different groups of points may be present in image $I_{SCC}(x)$ with each group comprising points x having the same label (x|label(x)=l). This method may be used independently of the HTANR method described above on any type of image.

Step 1: All connected components in the image $I_{SCC}(x)$ are located. Each connected component is formed by points x having the same label (i.e. in the same group). In one example, this step is performed using a neighborhood connectivity algorithm whereby the points x in each connected component are related to each other by a neighborhood relationship i.e. they are k-neighbor connected where k may be any suitable value, for example, 6 or 26.

Step 2: From the located connected components, the largest connected component comprising the highest number of points and the smallest connected component comprising the lowest number of points are determined. In one example, the located connected components are arranged in a descending order of the number of points f(i) in the located connected components. In other words, the located connected components are arranged in the order $c_1, c_2, \ldots c_n$ such that $f(1) \geq f(2) \ldots \geq f(n)$ (n indicates the number of connected components located. $f(1), f(2), \ldots f(n)$ indicate the number of points in connected components $c_1, c_2, \ldots c_n$, respectively).

Step 3: A cutoff value representing the maximum number of points in a small connected component is then calculated based on the number of points in the located connected components. In one example, the cutoff value is calculated by comparing a rate of decrease in the number of points from the largest connected component to the smallest connected component against the number of points in the remaining connected components. This is elaborated below.

The number of points f(i) in each located connected component $c_1, c_2, \ldots c_n$ is plotted against the order i of the located connected component in the arrangement formed in step 2. A plot comprising a two-dimensional data point set {(1,f(1)), (2,f(2)), ... (n, f(n))} is thus formed. A cutoff data point ($k^{th}$ data point (k, f(k)) in the two-dimensional data point set at a maximum distance (for example, maximum Euclidean distance) to a line L passing through the first and last data points ((1,f(1)) and (n,f(n))) of the two-dimensional point set is then located. These first and last data points respectively correspond to the largest and smallest connected components. If two or more points (e.g. (k, f(k)) and (j, f(j))) are at the same distance to the line L, then the leftmost point (k, f(k)) with the smallest index k (k<j) is selected. The cutoff value is then set as the number of points in the $k^{th}$ connected component corresponding to the cutoff data point (k,f(k)).

Step 4: For each located component, if the number of points in the located connected component is less than the cutoff value, it is identified as a small connected component. In other words, all connected components $c_i$ arranged after the $k^{th}$ connected component in the arrangement formed in step 2 (i.e. all connected components $c_i$ with the index i≥k) are identified as the small connected components.

FIGS. 5(a)-5(d) illustrate the results obtained from segmenting non-liver regions in step 102.

Figure 5:
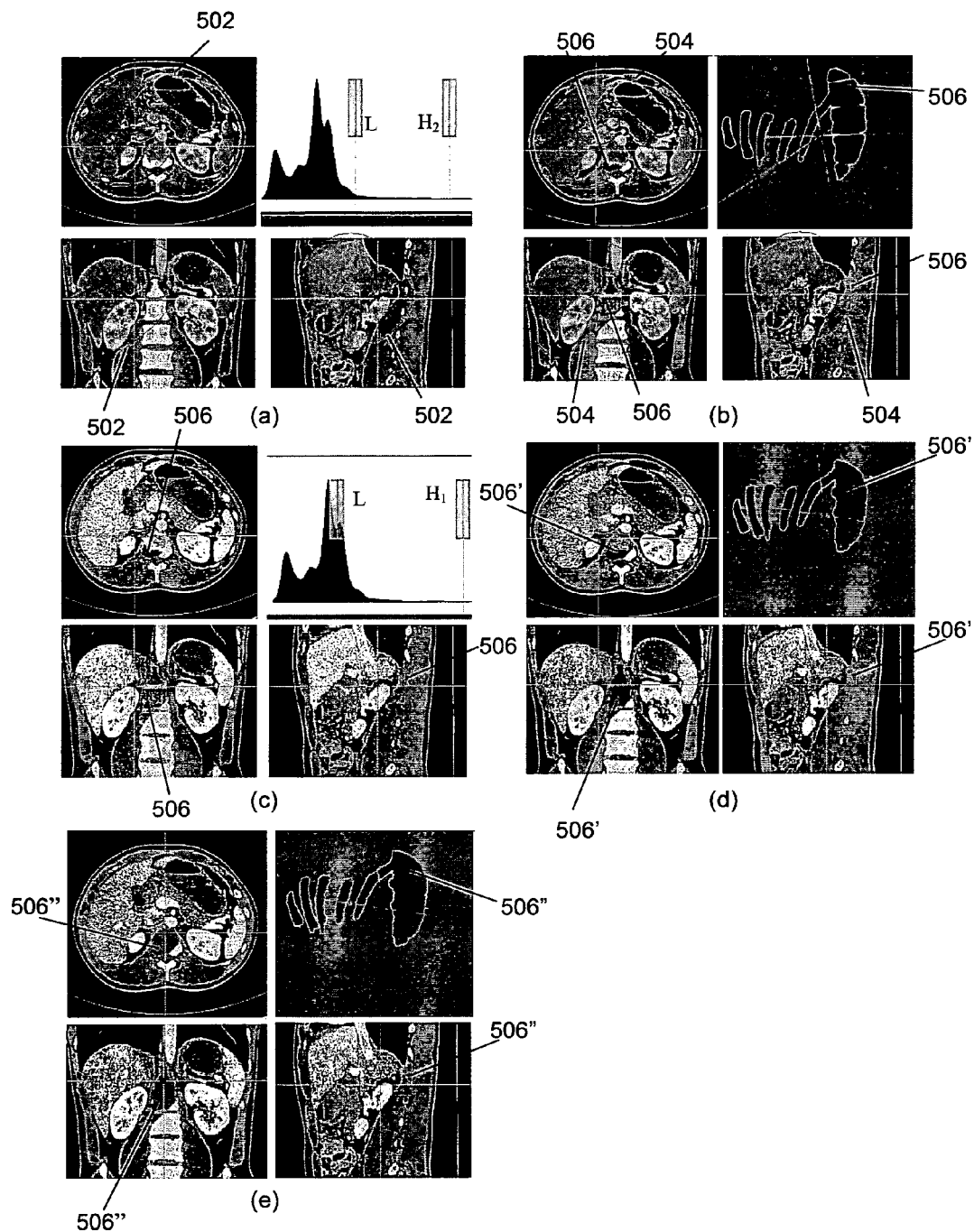
FIGS. 5(a)-5(e) illustrate the results obtained from segmenting non-liver regions in the method of FIG. 1(a)

FIG. 5(a) illustrates selected axial, coronal and sagittal slices of the image I(x) comprising the first region of interest Ω within the boundary 502. In step 3 of the HTANR method, this first region of interest Ω is thresholded using a narrow pair of intensity threshold values $[L_2, H_2]$. FIG. 5(a) further illustrates a histogram showing the positions of the narrow pair of intensity threshold values $[L_2, H_2]$ relative to the intensity distribution of the points in the region of interest Ω.

FIG. 5(b) illustrates the selected axial, coronal and sagittal slices of FIG. 5(a) after performing steps 1-6 of the HTANR method. As shown in FIG. 5(b), a binary region B(x) of the first region of interest Ω is formed within the boundary 504. In this binary region B(x), small connected components are removed whereas small holes are filled. The shaded regions (for example, region 506) in the binary region B(x) within the boundary 504 represent regions formed by points with the label 1. A 3D perspective of the regions formed by points with label 1 (for example, region 506) is also shown in FIG. 5(b).

FIG. 5(c) illustrates the selected axial, coronal and sagittal slices of FIG. 5(a) after performing binarization using the wide pair of intensity threshold values $[L_1, H_1]$. FIG. 5(c) further illustrates a histogram showing the positions of the wide pair of intensity threshold values $[L_1, H_1]$ with respect to the intensity distribution of the points in the first region of interest Ω.

FIG. 5(d) illustrates the selected axial, coronal and sagittal slices of FIG. 5(b) after expanding the connected regions formed by points with label 1 in step 7 of the HTANR method. This expansion is performed using the boundary patch region growing method. The shaded regions (for example, region 506') represent the expanded connected regions. A 3D perspective of the expanded connected regions (for example, region 506') is also shown in FIG. 5(d).

FIG. 5(e) illustrates the selected axial, coronal and sagittal slices of FIG. 5(d) after performing step 8 of the HTANR method to fill the small holes in the regions formed by points with the label 1. The shaded regions (for example, region 506") formed by the points with the label 1 represent the segmented non-liver regions. A 3D perspective of the segmented non-liver regions (for example, region 506") is also shown in FIG. 5(e).

Step 104: Segment the Liver in the Image I(x)

Figure 6:
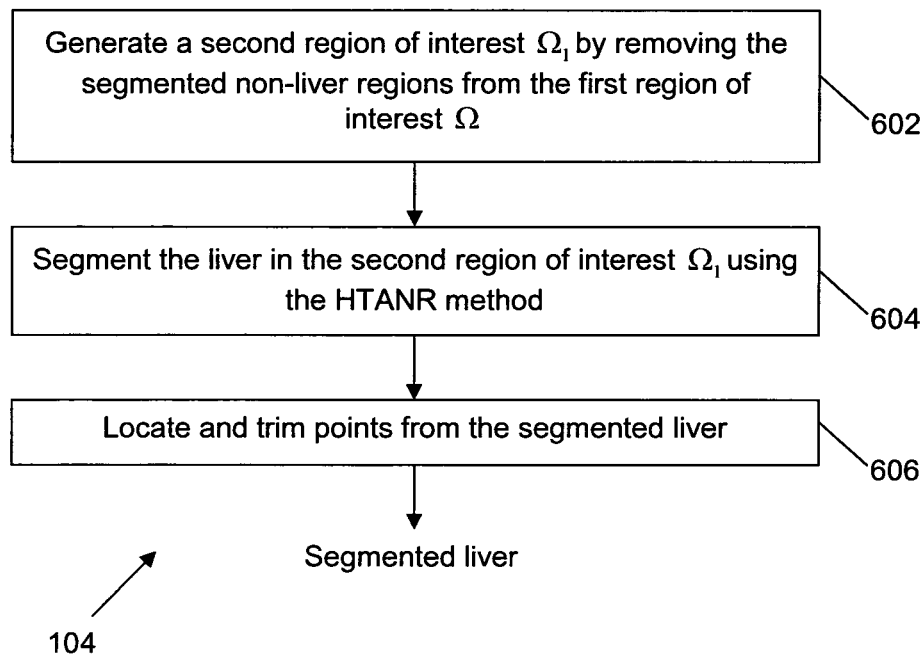
FIG. 6 illustrates a flow diagram of sub-steps for segmenting the liver in the method of FIG. 1(a)

In step 104, the liver in the image I(x) is segmented. FIG. 6 illustrates a flow diagram showing the sub-steps of step 104.

In sub-step 602, a second region of interest $Ω_1$ is generated from the first region of interest Ω by removing the segmented non-liver regions from the first region of interest Ω. Sub-step 602 helps to reduce user interaction. However, note that sub-step 602 is optional and the following sub-steps 604-606 may be performed directly on the first region of interest Ω, in other words, the HTANR method may be performed directly on the entire first region of interest Ω.

In sub-step 604, the HTANR method described above is performed on the second region of interest $Ω_1$ to segment the liver. In sub-step 606, the segmentation results are refined by locating and trimming points not belonging to the liver from the segmented liver. Sub-step 606 may involve an iterative procedure performed until an accurate liver segmentation is achieved. Whether the liver segmentation is accurate or not may be decided manually by a user viewing the segmented liver. Note that such a trimming step (as performed in sub-step 606) may also be performed in later steps of method 100 to refine the segmented liver tumors and/or liver vessels.

Figure 7:
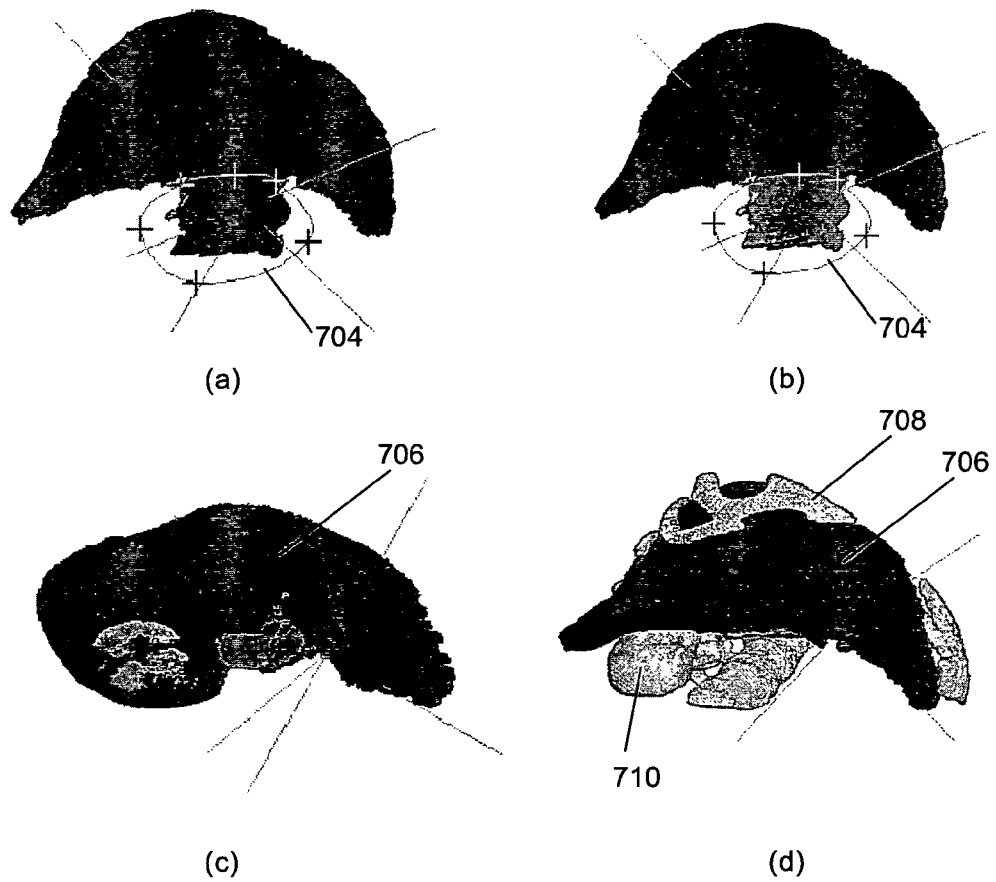
FIGS. 7(a)-7(d) illustrate the steps of a 3D trimming operation performed in the method of FIG. 6.

In one example, the trimming in sub-step 606 is performed by repeatedly using a 3D trimming operation in a 3D viewer. FIGS. 7(a)-7(d) illustrate steps of the 3D trimming operation performed on an example segmented liver. In the 3D trimming operation, the input 3-D image comprising the example segmented liver is first displayed in a 3D viewer at a proper view angle as shown in FIG. 7(a). The 3-D image is then projected onto a two-dimensional (2-D) image (not shown in FIG. 7) and a 2-D region in the 2-D image is then delineated. Points in the example segmented liver which have been projected onto the delineated 2-D region are then identified and removed. FIG. 7(a) shows the identification of these points within the boundary 704 whereas FIG. 7(b) shows the removal of these points (with the removed points within the boundary 704 shown in a lighter shade). FIG. 7(c) illustrates the trimmed segmented liver 706 at a different view angle whereas FIG. 7(d) illustrates the trimmed segmented liver 706 along with its neighboring bone 708 and kidney 710.

FIG. 8(a) illustrates the results from segmenting the non-liver regions in step 102 whereas FIGS. 8(b)-8(e) illustrate the results obtained from the sub-steps of segmenting the liver in step 104.

In FIG. 8(a), selected axial, coronal and sagittal slices comprising the segmented non-liver regions are shown. These segmented non-liver regions comprising the segmented kidney 804 and the segmented bone 806 lie within the first region of interest n shown within the boundary 802 in FIG. 8(a). A 3D perspective of the segmented kidney 804 and the segmented bone 806 is also shown in FIG. 8(a).

FIG. 8(b) show the axial, coronal and sagittal slices of FIG. 8(a) after performing sub-step 602 of step 104 to generate the second region of interest $Ω_1$ and steps 1-5 of the HTANR method. Shaded regions for example, region 808 represent regions formed by points with label 1. FIG. 8(b) further illustrates a 3D perspective of the regions (for example, region 808) formed by points with label 1 together with the segmented kidney 804 and the segmented bone 806.

FIG. 8(c) show the axial, coronal and sagittal slices of FIG. 8(b) after performing step 6 of the HTANR method to remove small artifacts from the regions formed by points with label 1. Similarly, shaded regions for example, region 808' represent the resulting regions formed by points with label 1 after performing step 6 of the HTANR method. FIG. 8(c) further illustrates a 3D perspective of the resulting regions (for example, region 808') formed by points with label 1.

FIG. 8(d) show the axial, coronal and sagittal slices of FIG. 8(c) after performing step 7 of the HTANR method to expand the connected regions formed by points with label 1. As mentioned above, a step of segmenting the points in the image I(x) using a wide pair of intensity threshold values $[L_1, H_1]$ may be performed to facilitate this expansion. Shaded regions (for example, region 808") in FIG. 8(d) represent the resulting regions formed by points with label 1 after performing step 7 of the HTANR method. FIG. 8(d) further illustrates a 3D perspective of the resulting regions (for example, region 808''') formed by points with label 1.

Figure 8:
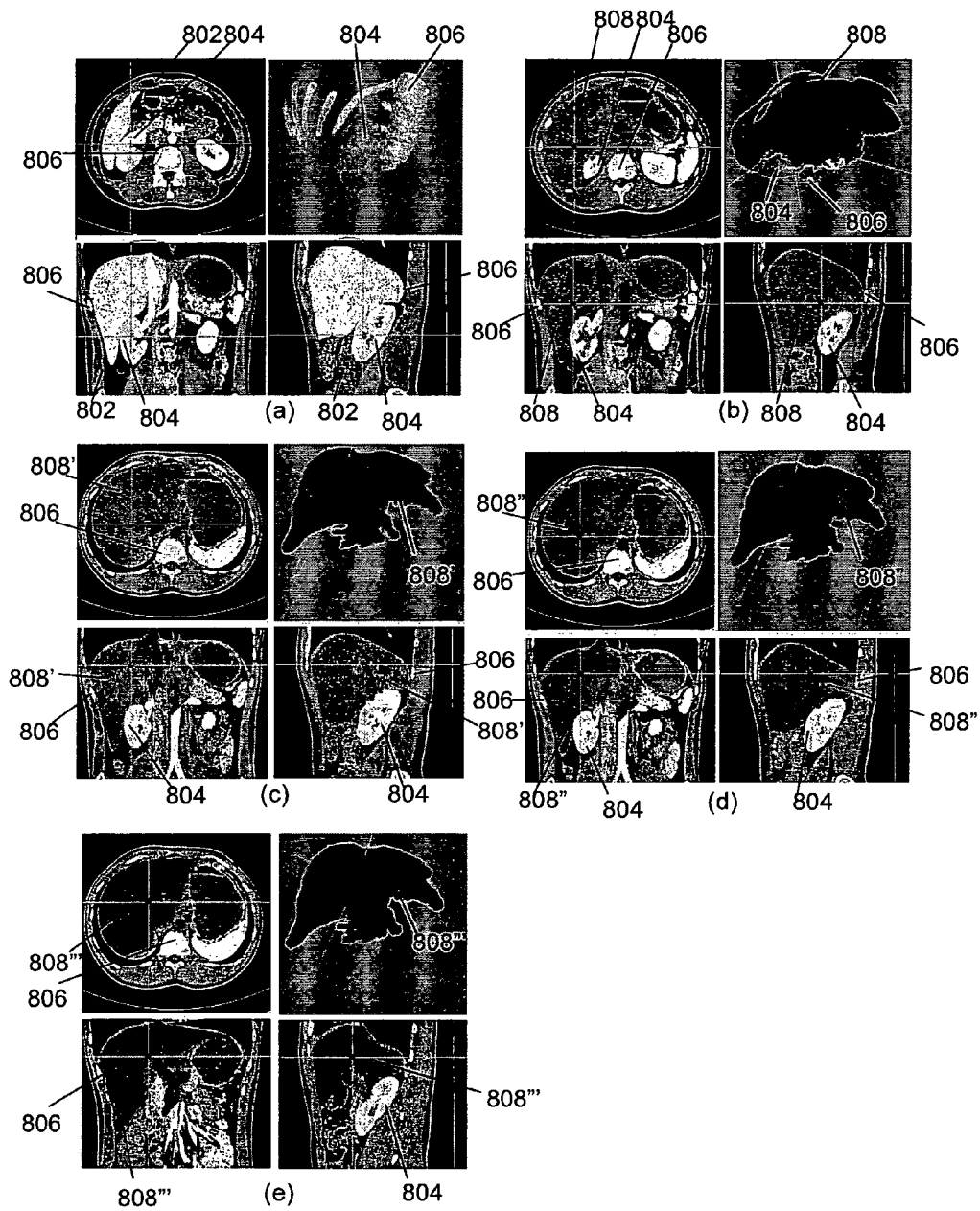

FIG. 8(*e*) show the axial, coronal and sagittal slices of FIG. 8(*d*) after performing step 8 of the HTANR method to fill the small holes in the regions formed by points with label 1. Similarly, the shaded regions (for example, region 808''') in FIG. 8(*e*) represent the resulting regions formed by points with label 1 after performing step 8 of the HTANR method. FIG. 8(*e*) further illustrates a 3D perspective of the resulting regions (for example, region 808''') formed by points with label 1. Points in these resulting regions form the segmented liver.

Step 106: Segment the Liver Tumor(s) in the Image I(x)

Figure 9:
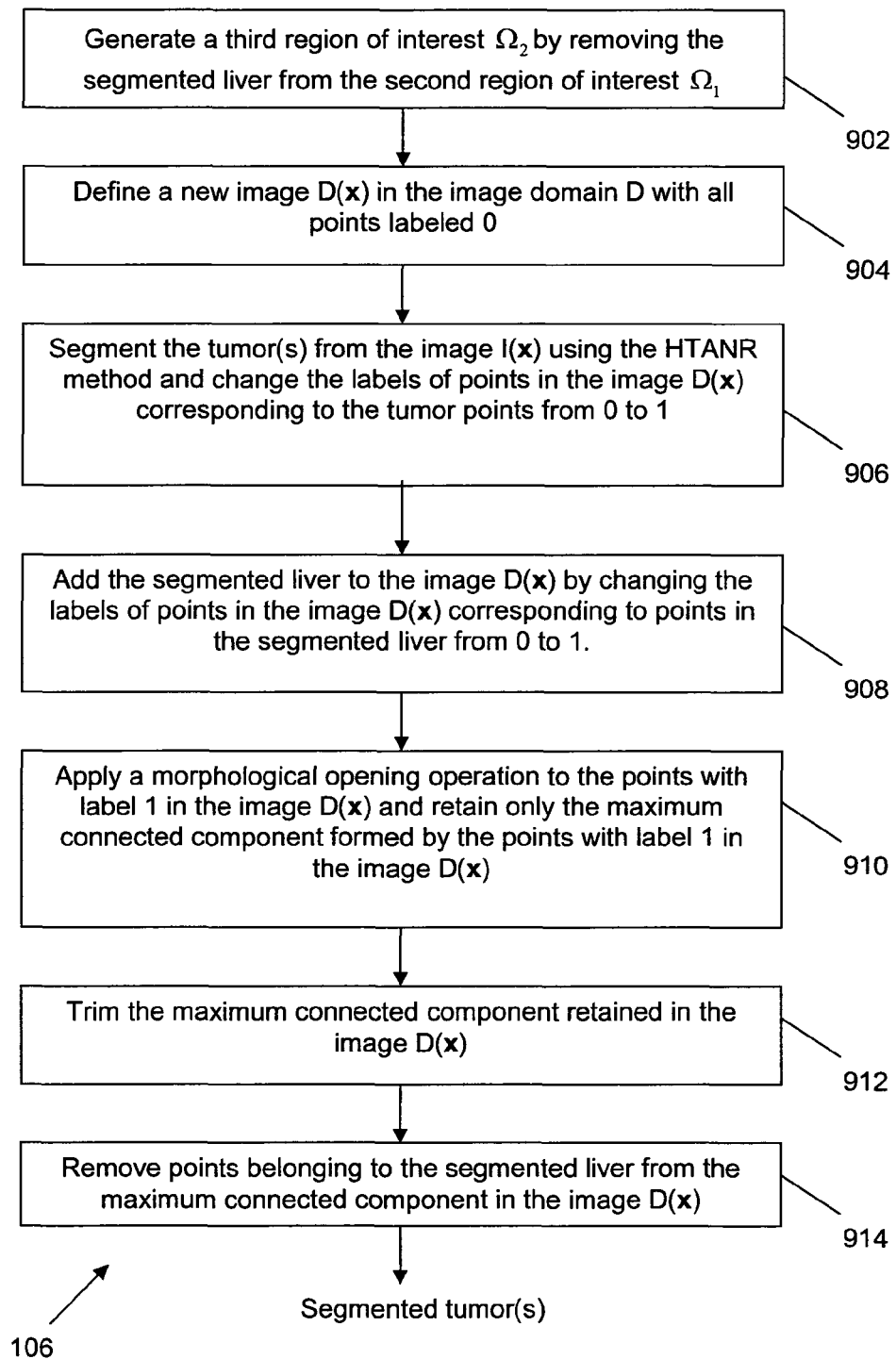
FIG. 9 illustrates a flow diagram of sub-steps for segmenting the liver tumor in the method of FIG. 1(a)

In step 106, one or more liver tumors in the image I(x) are segmented. FIG. 9 illustrates a flow diagram showing the sub-steps of step 106.

In sub-step 902, a third region of interest $\Omega_2$ is generated in the image I(x) by removing the segmented liver obtained in step 104 from the second region of interest $\Omega_1$. Note that sub-step 902 is optional and the following sub-steps 904-914 may be performed directly on the first region of interest $\Omega$, in other words, the HTANR method may be performed directly on the first region of interest $\Omega$.

In sub-step 904, a new image D(x) in the image domain D is defined such that the new image D(x) has the same dimensions as the image I(x) and each point in the new image D(x) has a corresponding point in the same position in the image I(x). However, the labels of all points x∈D in the image D(x) are initialized to 0.

In sub-step 906, the liver tumor(s) in the third region of interest $\Omega_2$ are segmented from image I(x) using the HTANR method. The segmented liver tumor(s) comprise a plurality of tumor points in the image I(x). The segmentation result is then saved using the new image D(x) by changing the labels of points in the image D(x) corresponding to the tumor points from 0 to 1.

In sub-step 908, the segmented liver from the image I(x) obtained in step 104 is added to the image D(x) by changing the labels of points in the image D(x) corresponding to points in the segmented liver from 0 to 1. In other words, the segmented liver is merged with the segmented tumor(s) in the image D(x) to form a combined liver object:

In sub-step 910, a morphological opening operation is applied to the points with label 1 (i.e. points in the combined liver object) in the image D(x). Connected components formed by points with the label 1 are then located and from these located connected components, a maximum connected component comprising the highest number of points is then located. Only points in the maximum connected component are retained and the points in the remaining connected components are removed by changing the labels of these points from 1 to 0.

In sub-step 912, the maximum connected component retained in sub-step 910 is trimmed. In one example, this is performed using the 3D trimming operation shown in FIGS. 7(*a*)-7(*d*).

In sub-step 914, points belonging to the segmented liver are then removed from the maximum connected component in the image D(x) by changing the labels of the points corresponding to points in the segmented liver from 1 to 0. This leaves updated segmented tumor(s) in the image D(x).

Note that it is preferable to include sub-steps 908-914 because if the morphological opening operation in sub-step 910 is performed directly on the segmented tumor(s) in the image I(x), the small segmented tumors may be removed from the segmentation results.

Step 108: Segment the Liver Vessels in the Image I(x)

Figure 10:
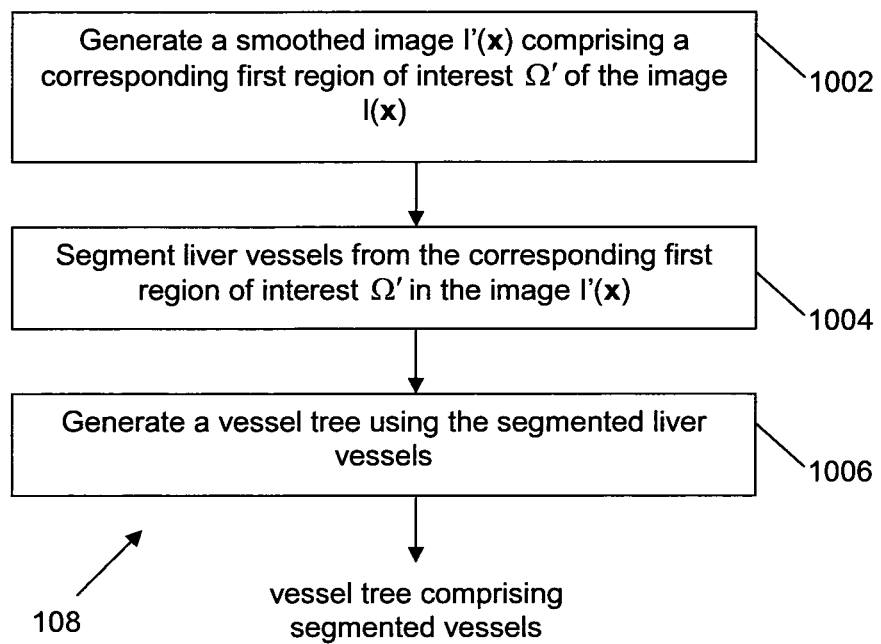
FIG. 10 illustrates a flow diagram of sub-steps for segmenting the liver vessels in the method of FIG. 1(a)

In step 108, liver vessels in the image I(x) are segmented. FIG. 10 illustrates a flow diagram showing the sub-steps of step 108.

In sub-step 1002, a smoothed image I'(x) is generated by for example, applying state-of-the-art vesselness filtering techniques to the image I(x). In sub-step 1004, the HTANR method is used to segment liver vessels from the smoothed image I'(x) in the corresponding first region of interest $\Omega'$ (which is a sub-volume of the image I'(x)). Please note that the smoothing sub-step 1002 is an optional step for the removal of noise in the image I(x). If the sub-step 1002 is not performed, in the sub-step 1004, the HTANR method is used directly in the original image I(x) to obtain the liver vessels in the first region of interest $\Omega$. In sub-step 1006, a vessel tree is then generated from the segmented liver vessels obtained in sub-step 1004. In one example, points of the segmented vessels are set as vessel points and the following directional region growing approach is repeatedly used to trace a vessel segment from a seed point which may be specified manually. A vessel tree is then formed from all the traced vessel segments.

Vessel Tree Tracking by Directional Region Growing

The following describes the steps of an example method for tracing a vessel segment using a directional region growing approach in an image $I_{DRG}(x)$. Note that this example method may be performed independently of the method 100 on any type of image. The image $I_{DRG}(x)$ may also be part of a region of interest in a larger image. For example, in sub-step 1006 of step 108, the image $I_{DRG}(x)$ is the corresponding first region of interest $\Omega'$ in the smoothed image I'(x).

Given that the image $I_{DRG}(x)$ comprises points with labels label(x) and a region V formed by vessel points q with labels indicating that they are part of the vessels in a structure of interest, the following steps are performed to trace a vessel segment from a seed point p (p ∈ V i.e. p is a vessel point in the region V).

Step 1: Without loss of generality, it is assumed that for the vessel direction $v(p)=(n_x, n_y, n_z)$, $|n_z|=\max\{|n_x|, |n_y|, |n_z|\}$. This indicates that the vessel direction v(p) is oriented along the axial direction of the image $I_{DRG}(x)$. In one example, the vessel direction $v(p)=(n_x, n_y, n_z)$ is calculated to confirm this assumption. If this assumption is found to be not true, the coordinate system is rotated until this assumption becomes true.

Step 2: A two-dimensional connected vessel region $S_0$ formed by vessel points and comprising the seed point p ∈ V is located. This two-dimensional connected vessel region $S_0$ lies on an axial slice comprising the seed point p.

Step 3: The connected vessel region $S_0$ is then expanded along the {0,0,1} direction (i.e. the positive z direction perpendicular to the region $S_0$) of the image $I_{DRG}(x)$. Note that the axes of the image $I_{DRG}(x)$ are defined such that the x axis lies parallel to the line of intersection between the axial and coronal planes of the image, the y axis lies parallel to the line of intersection between the axial and sagittal planes of the image and the z axis lies parallel to the line of intersection between the coronal and sagittal planes of the image.

In one example, the expansion of the vessel region $S_0$ is performed by generating a first further vessel region $S_1$ from the vessel region $S_0$ and successively generating a further vessel region from the most recently generated further vessel region $S_i$ (i=1, 2, . . . ). A further vessel region is only generated if a stop condition is not met. This applies even for the first further vessel region $S_1$. This stop condition is met when the further vessel region to be generated is empty (i.e. comprises no points), or when the number of points in the further vessel region to be generated is more than twice the number of points in the vessel region from which the further vessel region is to be generated.

The following describes how each further vessel region $S_{i+1}$ is generated from the vessel region $S_i$.

A region of interest in the image $I_{DRG}(x)$ is first formed based on the region $S_i$. In one example, the region of interest comprises all points in the image $I_{DRG}(x)$ which are immediately after the vessel points in the region $S_i$ along the positive z direction. In other words, points in the region of interest may be expressed as $\{(p_x, p_y, p_z+1) | p \in S_i\}$.

For each vessel point in the region of interest, it is determined if the vessel point belongs to the vessel segment to be formed. This is elaborated below.

For each vessel point q in the region of interest on the axial slice indexed by $z=p_z+1$ (i.e. the axial slice immediately after the axial slice comprising the region $S_i$ along the positive z direction), parameters such as the vessel direction and the vesselness of the vessel point q are calculated and based on these parameters, it is determined if the vessel point q belongs to the vessel segment. An example method for calculating the vesselness $\lambda(q)$ and the vessel direction $v(q)$ of the vessel point q is elaborated below. These parameters are dependent on the intensity values of the vessel points in a plurality of neighborhoods around the vessel point q.

In one example, the vessel point is determined as belonging to the vessel segment if the following conditions are satisfied:
  a) the vesselness of the vessel point q (i.e. $\lambda(q)$) is greater than a given threshold, in one example, 0.8; and
  b) the angle between the vessel direction of the vessel point $v(q)$ and the vessel direction of the seed point $v(p)$ is less than a given threshold, in one example, 45°

The further region $S_{i+1}$ is then generated as a connected component formed by these vessel points determined as belonging to the vessel segment. In one example, each vessel point in the region of interest satisfying the above conditions (a) and (b) is merged into the further region $S_{i+1}$ and the merging procedure is performed until no more vessel points can be merged into $S_{i+1}$.

Step 4: The connected vessel region $S_0$ is then expanded along the $\{0, 0, -1\}$ direction (i.e. the negative z direction perpendicular to the region $S_0$) of the image $I_{DRG}(x)$. In one example, this is performed by generating a plurality of further regions $S_{i+1}$, in the same manner as the expansion along the $\{0,0,1\}$ direction described above.

Step 5: The union of the vessel regions (i.e. the vessel region $S_0$ and all the further vessel regions) generated in steps 2 to 4 is obtained to form the vessel segment passing through the seed point p.

Note that in the above example method, the initial two-dimensional connected vessel region $S_0$ may lie on a coronal or sagittal slice in the image $I_{DRG}(x)$ or on a slice parallel to any other plane. In these cases, the vessel direction of the seed point p is adjusted accordingly. The two-dimensional region $S_0$ is then expanded in directions perpendicular to it to form the vessel segment.

Adaptive Vessel Direction and Vesselness Calculation

The following describes the steps of an example method for calculating the vessel direction $v(w)$ and the vesselness $\lambda(w)$ of a point w in an image $I_{VD}(x)$. Note that this example method may be performed independently of the above example method for generating a vessel segment and may be performed on any type of image. When used with the above example method for generating a vessel segment, the image $I_{VD}(x)$ is the image $I_{DRG}(x)$.

Given that the image $I_{VD}(x)$ comprises points with labels label(x) and a region V formed by vessel points q with labels indicating that they are part of the vessels in a structure of interest (q||label(q)=$l_v$), a plurality of neighborhoods $N_i(w)$ around the point $w \in V$ are defined such that $N_1(w) \subset N_2(w) \ldots \subset N_k(w)$ i.e. each neighborhood comprises a different number of points around the point w whereby $N_1(w)$ is the smallest neighborhood comprising the least number of points and $N_k(w)$ is the largest neighborhood comprising the most number of points. In one example, the neighborhoods around the point w (i.e. $N_i(w)$) are in the form of spheres centered at point w having increasing radii.

Each neighborhood $N_i(w)$ also comprises a plurality of vessel points. Denoting $O_i(w)$ as the vessel point set comprising the vessel points in each neighborhood $N_i(w)$, i.e. $O_i(w)=V \cap N_i(w)$ (i=1,2, … k), the following steps are used to calculate the vessel direction $v(w)$ and the vesselness $\lambda(w)$ of the point $w \in V$.

Step 1: For each vessel point set $O_i(w)$, a plurality of eigenvectors and eigenvalues are calculated based on the positions of the vessel points in the vessel point set $O_i(w)$. In one example, the first three eigenvectors $v_{1i}(w)$, $v_{2i}(w)$, $v_{3i}(w)$ (i=1,2,…,k) and their corresponding eigenvalues $\lambda_{1i}(w)$, $\lambda_{2i}(w)$ and $\lambda_{3i}(w)$ where $\lambda_{1i}(w) \geq \lambda_{2i}(w) \geq \lambda_{3i}(w)$ are calculated by performing principal analysis on the vessel point set $O_i(w)$.

Step 2: For each vessel point set $O_i(w)$, the first eigenvalue $\lambda_{1i}(w)$ is normalized using the expression $\lambda_{1i}(w)/[\lambda_{1i}(w)+\lambda_{2i}(w)+\lambda_{3i}(w)]$. The vessel point set $O_j(w)$ with the index j and having the highest normalized first eigenvalue is then located.

Step 3: The first eigenvector $v_{1j}(w)$ for the vessel point set $O_j(p)$ is output as the vessel direction $v(w)$ of the point w whereas the normalized first eigenvalue $\lambda_{1j}(w)/[\lambda_{1j}(w)+\lambda_{2j}(w)+\lambda_{3j}(w)]$ for the point set $O_j(w)$ is output as the vesselness $\lambda(w)$ of the point w.

Step 110: Partition the Liver Into Functional Liver Segments

In step 110, the liver is partitioned into functional liver segments.

Figure 11:
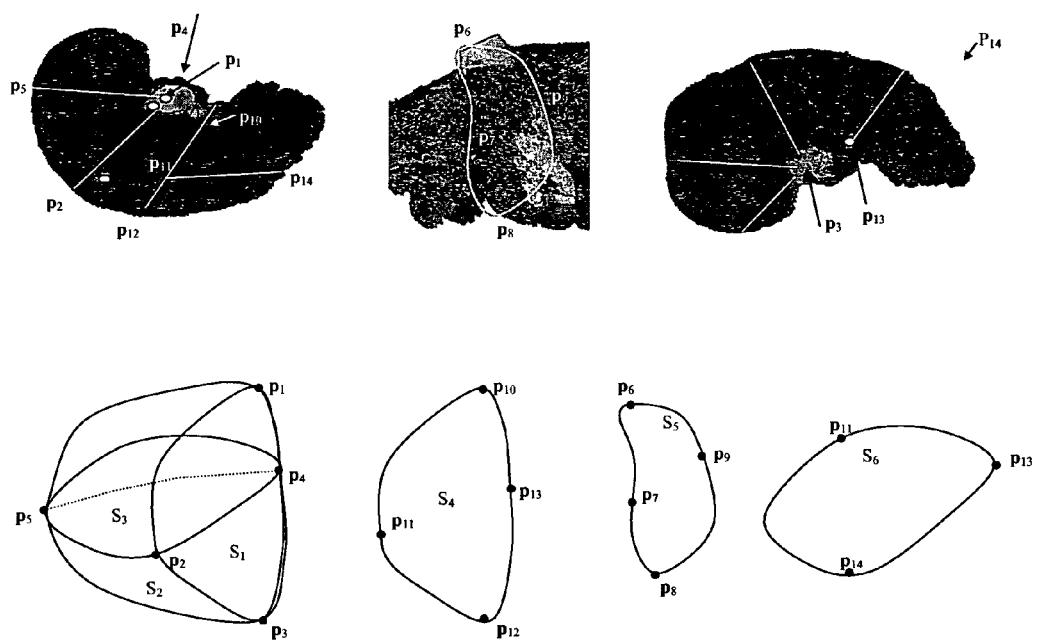
FIG. 11 illustrates the Couinaud classification of liver anatomy.

FIG. 11 shows the Couinaud classification of liver anatomy (which partitions the liver into Segments I-VIII). In FIG. 11, 6 surfaces $S_1, S_2, \ldots S_6$ are shown.

$S_1$ is defined by four control points $p_1, p_2, p_3$ and $p_4$, where points $p_1, p_3$ and $p_4$ are landmarks lying on the centerline of the IVC (Inferior vena cava). Points $p_1$ and $p_3$ respectively lie on the superior and inferior of the IVC whereas points $p_2$ and $p_4$ are the intersection points between the boundary contours of $S_1$ and $S_3$. The boundary contour of $S_1$ runs along the middle hepatic vein and subdivides the liver into the right lobe (Segments I to IV) and left lobe (Segments V-VIII).

$S_2$ is defined by four control points $p_1, p_5, p_3, p_4$, with the point $p_5$ being the intersection point between the boundary contours of $S_2$ and $S_3$. The boundary contour of $S_2$ runs along the right hepatic vein and subdivides the right lobe of the liver into the anterior part (Segments V and VIII) and the posterior part (Segments VI and VII).

$S_3$ is defined by three points $p_a, p_5$ and $p_2$. The boundary contour of $S_3$ runs along the portal vein plane and subdivides the right lobe of the liver into the superior part (Segments VII and VIII) and the inferior part (Segments V and VI).

$S_4$ is defined by four points $p_{10}, p_{11}, p_{12}$ and $p_{13}$, where points $p_{10}$ and $p_{12}$ are on the anterior and posterior of the umbilical fissure and points $p_{11}$ and $p_{13}$ are the intersection points between the boundary contours of $S_4$ and $S_6$. The boundary contour of $S_4$ runs along the umbilical fissure and divides the left lobe of the liver into the medial part (Segments I and IV) and the lateral part (Segments II and III).

$S_5$ is defined by four points $p_6$, $p_7$, $p_8$ and $p_9$ which lie along the boundary of the caudate lobe. The boundary contour of $S_5$ divides the middle of the left lobe into the caudate lobe (Segment I) and Segment IV.

$S_6$ is defined by three points $p_{11}$, $p_{14}$ and $p_{13}$ where the point $p_{13}$ is a landmark on the left lateral ridge of the liver. The boundary contour of $S_6$ divides the lateral of the left lobe into Segments II and III.

In one example, an extensible minimal surface method elaborated below is used to generate the partition surfaces $S_1$, $S_2$, ... $S_6$ from their control points respectively (i.e. from the points respectively defining the surfaces as mentioned above). For each partition surface, the respective control points are used as the first plurality of vertices for forming the first contour of the extensible minimal surface in the method described below. The positions of the control points can be adjusted, and new control points can also be inserted to generate exact liver segment partitions.

Extensible Minimal Surface Method

Figure 12:
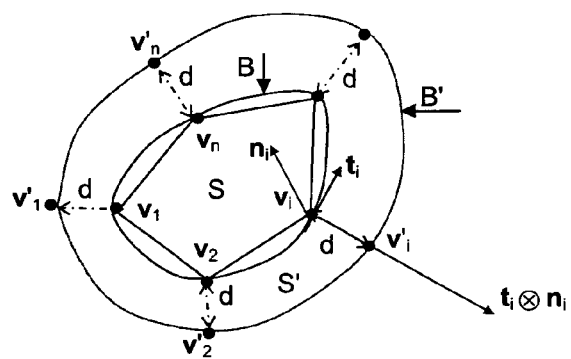
FIG. 12 illustrates the steps of an extensible minimal surface method for partitioning the segmented liver into functional liver segments in the method of FIG. 1(a)

The following describes the steps of an example extensible minimal surface method. Given an image $I_{EMS}(x)$, a first plurality of vertices $\{v_1, v_2, \ldots, v_n\}$ in three-dimensional space in the image $I_{EMS}(x)$ are set. With a predetermined extension width d (>0), an extensible minimal surface is then generated according to the following steps. This example extensible minimal surface method may be used on any type of image and may be used independently of method 100. The steps of this example extensible minimal surface method are illustrated in FIG. 12.

Step 1: A first contour B passing through the first plurality of vertices $v_1, v_2, \ldots, v_n$ is generated. The first contour B may be a Bezier contour.

Step 2: A first minimal surface S enclosed by the first contour B is then generated using for example, state-of-the-art technology [7].

Step 3: A second plurality of vertices $\{v'_1, v'_2, v'_n\}$ is then formed using the first plurality of vertices $\{v_1, v_2, \ldots, v_n\}$ as follows.

At each vertex $v_i$ (i=1, 2, ..., n) in the first plurality of vertices, the normal $n_i$ to the first minimal surface S and the tangent $t_i$ to the first contour B at the vertex $v_i$ are calculated where $t_i$ is in the anti-clockwise direction of $n_i$. The cross product between the normal $n_i$ and the tangent $t_i$ i.e. $n_i \otimes t_i$ is then calculated and based on this cross product, a vertex $v'_1$ in the second plurality of vertices is obtained. In one example, $v'_i = v_i + d*(n_i \otimes t_i)$. In other words, the vertex $v'_i$ lies on a vector formed by the calculated cross product and lies at a predetermined distance (equal to the predetermined extension width d) away from the vertex $v_i$.

Step 4: A second contour B' passing through the second plurality of vertices $\{v_1, v'_2, \ldots, v'_n\}$ is then generated. The second contour B may be a Bezier contour.

Step 5: A second minimal surface S' enclosed between the first and second contours B and B' is generated using for example, state-of-the-art technology [7].

Step 6: The first and second minimal surfaces S and S' are then combined to form the extensible minimal surface, which is adjustable by adjusting the first plurality of vertices on the first contour B. Note that the first contour B and the first plurality of vertices remain visible after the combination of surfaces S and S' to facilitate the adjustment of the first plurality of vertices.

Step 112: Smooth the Liver Objects

In step 112, the volumes of the segmented liver objects comprising the segmented liver from step 104, the segmented liver tumor from step 106 and the segmented liver vessels from step 108 are smoothed. In one example, step 112 is performed using the following example distance map-based binary volume smoothing algorithm on each of the segmented liver object.

Distance Map-Based Binary Volume Smoothing

Given an image $I_{BVS}(x)$ defined in the domain $D \subset R^3$ and comprising an object formed by points with the same label label(x)=l, the following describes the steps of an example distance map-based binary volume smoothing algorithm for smoothing the object $\{x|label(x)=l\}$. This algorithm can be used independently of method 100 on any type of image comprising any type of object.

Step 1: The boundary $\partial$ of the object is located as follows. For each point x∈D, if the label of the point x is l and there exists at least one point x' within the neighbourhood of x such that the label of the point x' is not l, then the point x is considered as a point on the boundary $\partial$ of the object (i.e. x∈$\partial$).

Step 2: A truncated distance map is then calculated as follows. For each point x∈D, a distance map value f(x) is calculated based on a distance between the point x and the boundary $\partial$ of the object. This is performed as follows.

The distance map value f(x) is a signed function. If the label of the point x is l, the distance map value f(x) of the point x is set as max $\{-d_0, -d(\partial,x)\}$, otherwise, if the label of the point x is not l, the distance map value f(x) of the point x is set as min $\{d_0, d(\partial,x))\}$. $d_0$ is a predetermined positive threshold (i.e. a constant) and $d(\partial,x)$ is the minimal distance (for example, minimal Euclidean distance) of the point x to the boundary $\partial$ of the object and may be calculated as the distance between the point x and the object boundary point nearest to the point x wherein an object boundary point is a point lying on the boundary $\partial$. Note that $d(\partial,x)$ is always greater than or equal to zero.

Step 3: Updated distance map values f'(x) are then obtained by smoothing a function formed by the distance map values f(x). In one example, Gaussian smoothing is used. This smoothing step may change the signs of the distance map values of some points x.

Step 4: The smoothed object volume is then formed using the updated distance map values f'(x). In one example, the volume formed by the points x with a corresponding updated distance map value f'(x) less than or equal to zero i.e. $\{x|f'(x) \leq 0\}$ is output as the smoothed object volume.

Figure 13:
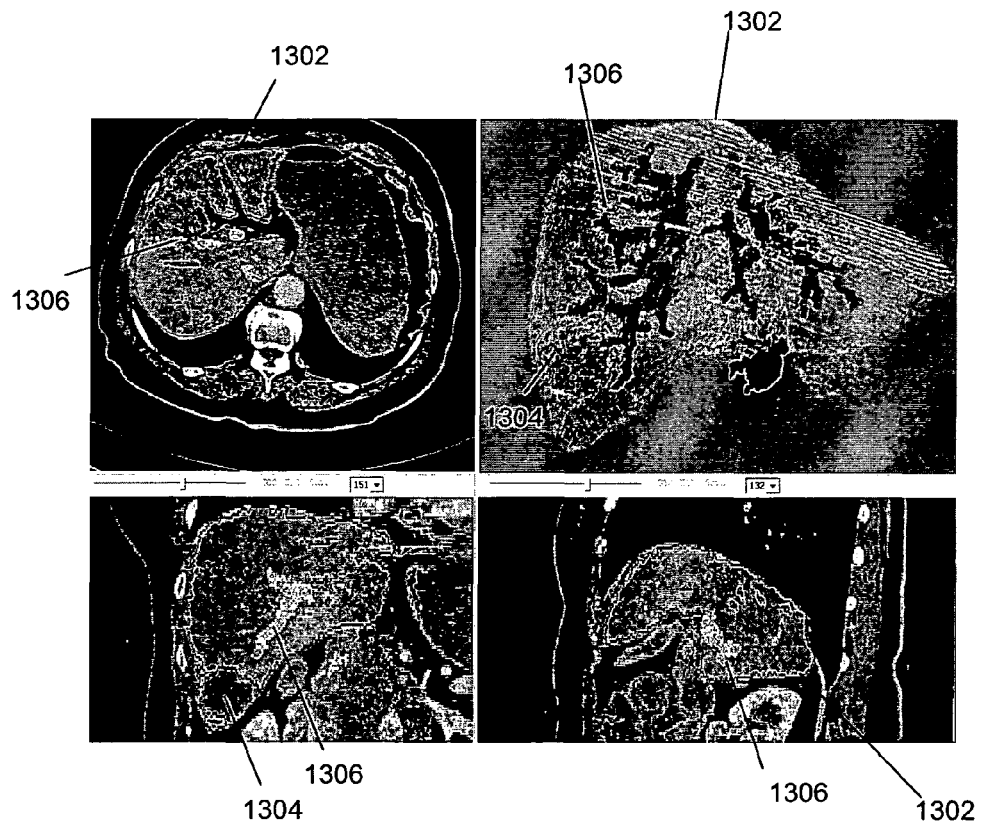
FIG. 13 illustrates the results of the method of FIG. 1(a).

FIG. 13 illustrates the results obtained from method 100. In particular, FIG. 13 illustrates selected axial, coronal and sagittal slices comprising the segmented liver objects such as the liver enclosed by the boundary 1302, the liver tumor 1304 and the liver vessels (for example, vessels 1306). A 3D perspective of the segmented liver objects is also shown in FIG. 13.

The embodiments of the present invention as described above may be performed by a computer system having a processor. There may also be a computer program product such as a tangible data storage device, readable by a computer and containing instructions operable by a processor of a computer system to cause the processor to perform the above embodiments of the present invention.

The advantages of the embodiments of the present invention are as follows.

In the example embodiments, a triangular mesh interpolation technique is used to generate a first region of interest (ROI) from a simplified liver surface model. The simplified liver surface model may be constructed using several control points and in one example, is constructed using two contours and a total of 14 control points comprising two terminal landmark points. Hence, the position, size and shape of the ROI can be easily adjusted in three-dimensional space by simply changing the positions of the control points. Also, because of the nature of triangular interpolation, the resulting ROI roughly fits the liver in the image and contains only a small percentage of non-liver regions. In other words, the ROI takes the expected shape of the liver in the image. This facilitates the subsequent processing steps for segmenting the liver objects.

In the example embodiments, an extensible minimal surface method is used to partition the liver into functional liver segments. Since the partition surfaces (i.e. the extensible minimal surfaces) are freeform surfaces having shapes which can be varied by changing the positions of a few vertices (or control points), an accurate liver partitioning may be achieved with minimal interaction.

In the example embodiments, a HTANR method is used for segmenting liver objects. In the HTANR method, an automatic method for identifying small connected components is used to improve the morphological analysis. Firstly, this method is used for removing noise (false positive points) that are misclassified as object points by identifying and removing small connected components that are disconnected with the main object of interest. Secondly, this method is used to recover false negative points that are classified as non-object points by filling up small holes (small connected components) within the object of interest.

In the example embodiments, a distance-map based approach is used to smooth the binary volumes resulting from the segmentation of the liver objects. This helps to remove small artifacts and further helps in the generation of more realistic models to enhance user visualization of the segmented liver objects.

Using the example embodiments, multiple tumors (if any) can be segmented automatically and the segmentation results can be simultaneously displayed for expert validation. This helps in achieving an accurate diagnosis when there are multiple small tumors inside a liver of a patient. This is advantageous over existing software used in hospitals which often require clinicians to perform a time-consuming process of locating each tumor by scrolling through each image slice in the image volume.

In the example embodiments, an adaptive vessel tree tracking method (i.e. the directional region growing approach) is used to group all the vessels into a vessel tree structure. Using both the vesselness and vessel direction of each vessel point to guide the tracing procedure, inter- and intra-crossing or adhesion of vessel segments can be reduced.

Hence, a fast and accurate segmentation of liver objects from images such as CT images can be achieved using the embodiments of the present invention. These embodiments can be used for the following commercial applications:

(1) A service for liver object segmentation (similar to that of MeVis) based on the embodiments of the present invention may be deployed.
(2) A dedicated software tool for liver object segmentation may be developed based on the embodiments of the present invention. This may be a standalone application or may be used to supplement the service in (1), differentiating this service from the service in MeVis.
(3) The liver segmentation modules in the embodiments of the present invention may be integrated into a general tool MIUE (Model-based Image Understanding Environment) previously developed by the inventors for the segmentation, modeling and visualization of anatomic structures and lesions from medical images.

References

[1] Selle D, Preim B, Schenk A, et al. (2002) "Analysis of Vasculature for Liver Surgery Planning", IEEE trans. on TMI, 21(11), 1344-1357.

[2] Reitinger B, Bornik A, Beichel R, et al. (2006) "Liver Surgery Planning Using Virtual Reality", IEEE Computer Graphics and Applications, 26(6), 36-47.

[3] Nicolau S A, Pennec X, Soler L, et al. (2009) "An Augmented Reality System for Liver Thermal Ablation: Design and Evaluation on Clinical Cases", Medical Image Analysis, 13(3), 494-506.

[4] http://www.mevismedical.com/MeVis Distant Services.html

[5] Alex Vlachos, Sorg Peters, Chas Boyd Jason L. Mitchell (2001), "Curved PN Triangles", Proceedings of the 2001 symposium on Interactive 3D graphics, pp. 159-166.

[6] Zhihong Mao, Lizhuang Ma and Wuzheng Tan (2005) "A Modified Nielson's Side-Vertex Triangular Mesh Interpolation Scheme ", Computational Geometry and Applications (CGA '05) Workshop, 776-785.

[7] Wenyu Chen, Yiyu Cai and Jianmin Zheng (2008) "Constructing Triangular Meshes of Minimal Area", Computer-Aided Design & Applications, 5(1-4), 508-518.

[8] Otsu, N., (1979) "A Threshold Selection Method from Gray-Level Histograms". Systems, Man and Cybernetics, IEEE Transactions on, 9(1), 62-66.

[9] Liao, P. S. and T. S. C. P. C. Chung (2001) "A Fast Algorithm for Multilevel Thresholding", J. Inf. Sci. Eng., 17(5), 713-727.

[10] Jimin Liu, Su Huang, Wieslaw L. Nowinski (2009) "Automatic Segmentation of the Human Brain Ventricles from MR Images by Knowledge-Based Region Growing and Trimming", Neuroinform, 7, 131-146.

[11] Xiaoning Qian, et. al, (2009) "A non-parametric vessel detection method for complex vascular structures", 13(1), 49-61.

[12] Rashindra Manniesing, Max A. Viergever, Wiro J. Niessen (2006), "Vessel enhancing diffusion: A scale space representation of vessel structures", Medical Image Analysis 10 815-825.

What is claimed is:

1. A method for segmenting an object of interest in an input image comprising a plurality of points having respective intensity values representing medical data, the method comprising the steps of:
  (1a) segmenting the points in a region of interest in the input image into a first and second group of points using predetermined intensity threshold values;
  (1b) identifying a first set of small connected components formed by points in the first group of points and transferring the points in the first set of small connected components to the second group of points;
  (1c) identifying a second set of small connected components formed by points in the second group of points and transferring the points in the second set of small connected components to the first group of points; and
  (1d) forming the segmented object of interest using the first group of points;
  wherein each set of small connected components formed by points in the respective group of points is identified by a method comprising the steps of:
    (1i) locating connected components formed by points in the respective group of points;
    (1 ii) calculating a cutoff value representing the maximum number of points in a small connected component, the cutoff value being calculated based on the number of points in the located connected components; and
    (1 iii) for each located connected component, if the number of points in the located connected component is less than the cutoff value, identifying the located connected component as a small connected component.

2. A method according to claim 1, wherein sub-step (1ii) further comprises the sub-steps of:
(4i) from the located connected components, determining the largest and smallest connected components respectively comprising the highest and lowest number of points; and
(4ii) calculating the cutoff value by comparing a rate of decrease in the number of points from the largest located connected component to the smallest located connected component against the number of points in the remaining located connected components.

3. A method according to claim 2, wherein sub-step (4i) further comprises the sub-step of arranging the located connected components in a descending order of the number of points in the located connected components and sub-step (4ii) further comprises the sub-steps of:
(5i) plotting the number of points in each located connected component against the order of the located connected component in the arrangement to form a plot comprising a set of data points;
(5ii) selecting a cutoff data point in the set of data points wherein the distance between the cutoff data point and a line passing through the data points corresponding to the largest and smallest located connected components is maximum; and
(5iii) calculating the cutoff value as the number of points in the located connected component corresponding to the cutoff data point.

4. A method for segmenting liver objects comprising a liver, at least one liver tumor and liver vessels in a three-dimensional input image comprising a plurality of points having respective intensity values representing medical data, the method comprising the steps of:
(6a) defining a region of interest which takes the expected shape of the liver in the input image;
(6b) segmenting the liver in the region of interest;
(6c) segmenting the at least one liver tumor in the region of interest;
(6d) segmenting the liver vessels in the region of interest;
(6e) smoothing the segmented liver objects; and
(6f) partitioning the segmented liver into functional liver segments.

5. A method according to claim 4, wherein step (6a) further comprises the sub-steps of:
(7i) constructing a liver surface model by generating a smooth mesh from a first setting of a plurality of control points;
(7ii) fitting the liver surface model to a liver in the input image by deforming the liver surface model by moving the plurality of control points; and
(7iii) defining the region of interest as the sub-volume of the input image enclosed by the fitted liver surface model.

6. A method according to claim 4, wherein step (6b) further comprises the sub-steps of:
(8i) segmenting the points in the region of interest into a first and second group of points using predetermined intensity threshold values;
(8ii) identifying a first set of small connected components formed by points in the first group of points and transferring the points in the first set of small connected components to the second group of points;
(8iii) identifying a second set of small connected components formed by points in the second group of points and transferring the points in the second set of small connected components to the first group of points;
(8iv) forming the segmented liver using the first group of points; and
(8v) refining the segmented liver by trimming points which do not belong to the liver.

7. A method according to claim 6, wherein step (8v) further comprises repeating the following sub-steps:
(9i) projecting the segmented liver onto a two-dimensional image;
(9ii) delineating a region in the two-dimensional image; and
(9iii) trimming the segmented liver by identifying and removing points in the segmented liver projected onto the delineated region.

8. A method according to claim 4, further comprising a step of trimming at least one of the segmented liver objects by repeating the following sub-steps:
(10i) projecting the at least one segmented liver object onto a two-dimensional image;
(10ii) delineating a region in the two-dimensional image; and
(10iii) trimming the at least one segmented liver object by identifying and removing points in the at least one segmented liver object projected onto the delineated region.

9. A method according to claim 4, wherein step (6c) further comprises the sub-steps of:
(11i) segmenting the points in the region of interest into a first and second group of points using predetermined intensity threshold values;
(11ii) identifying a first set of small connected components formed by points in the first group of points and transferring the points in the first set of small connected components to the second group of points;
(11iii) identifying a second set of small connected components formed by points in the second group of points and transferring the points in the second set of small connected components to the first group of points;
(11iv) forming the at least one segmented liver tumor using the first group of points;
(11v) merging the at least one segmented liver tumor with the segmented liver to form a combined liver object comprising a plurality of points;
(11vi) performing a morphological operation to the points in the combined liver object;
(11vii) locating connected components formed by points in the combined liver object and from the located connected components, locating a maximum connected component comprising the highest number of points; and
(11viii) forming at least one updated segmented liver tumor by removing points belonging to the segmented liver from the maximum connected component.

10. A method according to claim 4, wherein the step (6d) further comprises the sub-steps of:
(12i) segmenting the points in the region of interest into a first and second group of points using predetermined intensity threshold values;
(12ii) identifying a first set of small connected components formed by points in the first group of points and transferring the points in the first set of small connected components to the second group of points;
(12iii) identifying a second set of small connected components formed by points in the second group of points and transferring the points in the second set of small connected components to the first group of points;

(12iv) forming the segmented liver vessels using the first group of points, the segmented liver vessels comprising vessel points; and (12v) tracing vessel segments repeatedly from the vessel points to form a vessel tree, each vessel segment being traced according to the following sub-steps (12v-i to 12v-iii):

(12v-i) selecting a seed point from the vessel points in the segmented liver vessels;

(12v-ii) locating a two-dimensional connected vessel region formed by vessel points and comprising the seed point; and (12v-iii) expanding the two-dimensional connected vessel region in directions perpendicular to the two-dimensional connected vessel region to form the vessel segment.

11. A method according to claim 10, wherein the sub-step (12v-iii) further comprises the sub-steps of:

(13i) checking if a stop condition is met and if not, generating a first further vessel region from the two-dimensional connected vessel region;

(13ii) successively checking if the stop condition is met, and if not, generating a further vessel region from the most recently generated further vessel region; and (13iii) forming the vessel segment as a union of the two-dimensional connected vessel region and the generated further vessel regions.

12. A method according to claim 11, wherein the stop condition is met when the further vessel region to be generated is found to comprise no points or when the number of points in the further vessel region to be generated is found to be more than twice the number of points in the vessel region from which the further vessel region is to be generated.

13. A method according to claim 11, wherein each further vessel region is generated according to the following sub-steps:

(15i) forming a region of interest based on the vessel region from which the further vessel region is to be generated;

(15ii) for each vessel point in the region of interest, determining if the vessel point belongs to the vessel segment; and (15iii) generating the further vessel region as a connected component formed by vessel points in the region of interest determined as belonging to the vessel segment.

14. A method according to claim 13, wherein sub-step (15ii) further comprises the following sub-steps for each vessel point in the region of interest:

(16i) calculating parameters of the vessel point in the region of interest, the parameters being dependent on the intensity values of vessel points in a plurality of neighborhoods around the vessel point in the region of interest; and (16ii) determining if the vessel point in the region of interest belongs to the vessel segment based on the calculated parameters.

15. A method according to claim 14, wherein the parameters comprise a vessel direction and a vesselness of the vessel point in the region of interest and sub-step (16i) further comprises the sub-steps of:

(17i) defining a plurality of neighborhoods around the vessel point in the region of interest, each neighborhood comprising a plurality of vessel points and a different number of points;

(17ii) for each neighborhood, forming a vessel point set comprising the vessel points in the neighborhood;

(17iii) calculating a plurality of eigenvectors and eigenvalues for each vessel point set based on the positions of the vessel points in the vessel point set;

(17iv) normalizing the first eigenvalue for each vessel point set; and (17v) respectively calculating the vessel direction and the vesselness of the vessel point as the first eigenvector and first normalized eigenvalue of the vessel point set having the highest normalized first eigenvalue.

16. A method according to claim 15, wherein the vessel point in the region of interest is determined as belonging to the vessel segment if the vesselness of the vessel point is greater than a predetermined threshold and the angle between the vessel direction of the vessel point and the vessel direction of the seed point is less than a predetermined threshold.

17. A method according to claim 10, wherein prior to sub-step 12(v-ii), the method further comprises the sub-steps of calculating a vessel direction for the seed point and if the vessel direction for the seed point is not oriented along an expected direction in the input image, rotating a coordinate system of the input image until the vessel direction of the seed point is oriented along the expected direction.

18. A method according to claim 4, wherein each segmented liver object comprises a subset of the points in the input image and step (6e) comprises the following sub-steps for each segmented liver object:

(20i) calculating a distance map value for each point in the input image based on a distance between the point and a boundary of the segmented liver object;

(20ii) obtaining updated distance map values by smoothing a function formed by the distance map values; and (20iii) forming a smoothed volume of the segmented liver object using the updated distance map values.

19. A method according to claim 4, wherein step (6f) further comprises the sub-steps of:

(21i) setting a first plurality of vertices on a surface of the segmented liver and generating a first minimal surface using the first plurality of vertices;

(21ii) forming a second plurality of vertices using the first plurality of vertices and generating a second minimal surface using the first and second plurality of vertices;

(21iii) forming an extensible minimal surface by combining the first and second minimal surfaces wherein the extensible minimal surface is adjustable by adjusting the first plurality of vertices; and (21iv) partitioning the segmented liver into functional liver segments using the extensible minimal surface.

20. A method according to claim 19, wherein the first minimal surface is enclosed by a first contour passing through the first plurality of vertices and sub-step (21ii) further comprises the following sub-steps for each vertex in the first plurality of vertices:

(22i) calculating a normal to the first minimal surface and a tangent to the first contour at the vertex;

(22ii) calculating a cross product between the calculated normal and the calculated tangent; and (22iii) forming a vertex in the second plurality of vertices using the calculated cross product.

21. A method according to claim 20, wherein the vertex in the second plurality of vertices lies on a vector formed by the calculated cross product and lies at a predetermined distance away from the corresponding vertex in the first plurality of vertices.

* * * * *